United States Patent [19]

Fecher

[11] Patent Number: 5,233,905
[45] Date of Patent: Aug. 10, 1993

[54] ADJUSTABLE PLUNGER FOR CONTROL VALVE

[75] Inventor: Douglas A. Fecher, Granger, Ind.

[73] Assignee: Allied-Signal Inc., Morristown, N.J.

[21] Appl. No.: 889,553

[22] Filed: May 27, 1992

[51] Int. Cl.[5] ............................................. F15B 9/10
[52] U.S. Cl. ............................ 91/369.002; 91/376 R; 92/99
[58] Field of Search ............... 91/369.1, 369.2, 369.3, 91/376 R; 92/96, 98 R, 99, 100

[56] References Cited

U.S. PATENT DOCUMENTS

| | | | |
|---|---|---|---|
| 3,151,530 | 10/1964 | Brown | 91/376 R X |
| 3,807,280 | 4/1974 | Green et al. | 91/376 R X |
| 3,831,489 | 8/1974 | Woo | 91/376 R |
| 4,354,353 | 10/1982 | Laue | 91/369.2 X |
| 4,487,105 | 12/1984 | Harrison | 91/369.3 |
| 5,136,927 | 8/1992 | Rossigno et al. | 91/376 R X |

FOREIGN PATENT DOCUMENTS 2493784  5/1982  France .................. 91/369.3

Primary Examiner—Edward K. Look
Assistant Examiner—Hoang Nguyen
Attorney, Agent, or Firm—Leo H. McCormick, Jr.; Ken C. Decker

[57] ABSTRACT

A plunger for a control valve having a head with a tab located in a slot in a hub member and a cylindrical body with a threaded projection connected to the head. Rotation of the cylindrical body moves the head in the slot to establish the space relationship between a reaction disc and a face on the head. The space relationship sets the distance that a reaction disc must be extruded by a reaction force before opposing an input force. The delay in opposing an input force assures that a predetermined force is developed and immediately supplied to a master cylinder.

3 Claims, 1 Drawing Sheet

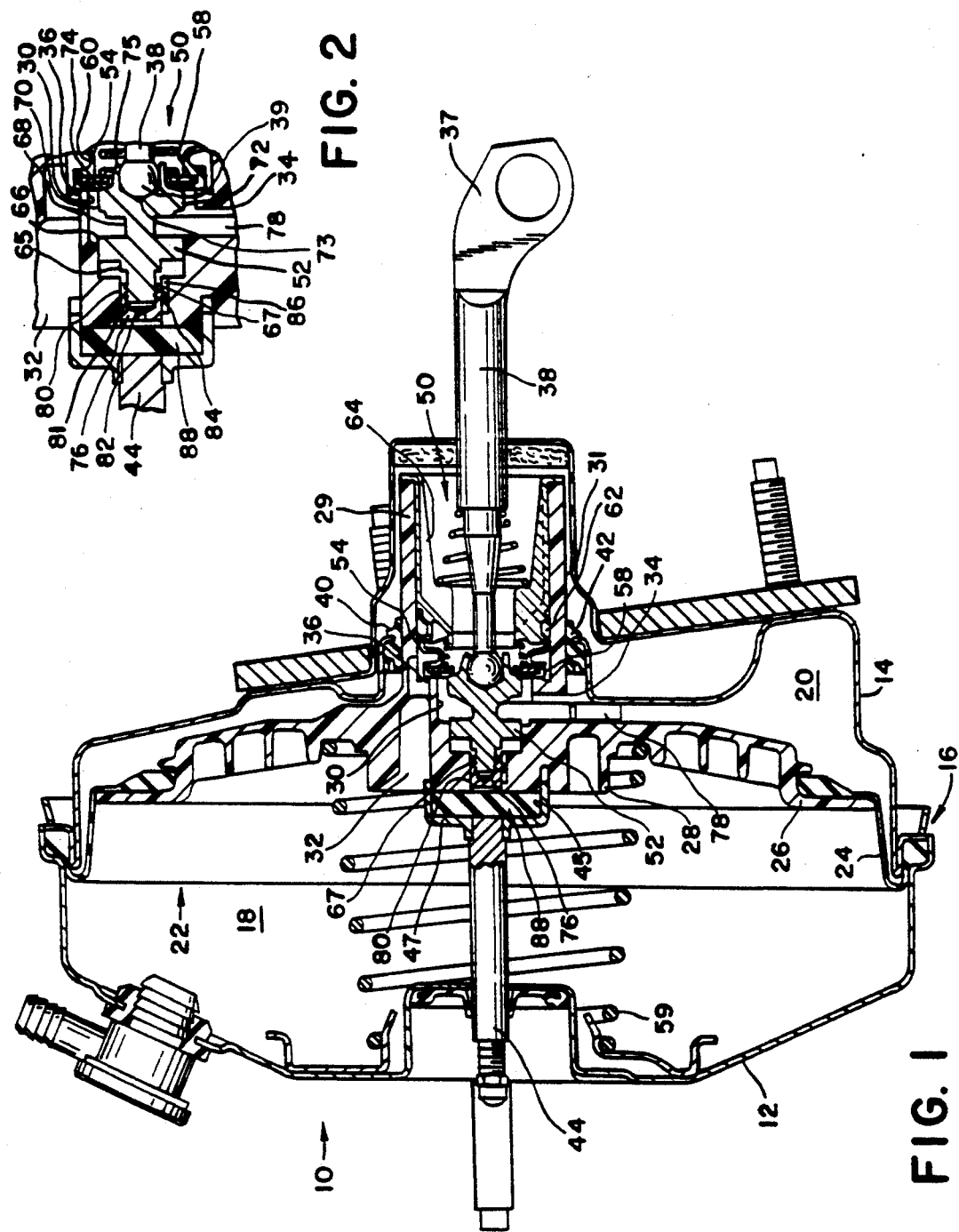

ADJUSTABLE PLUNGER FOR CONTROL VALVE

This invention relates to means for adjusting the space relationship between a reaction disc and a face on a plunger of a control valve in a brake booster to delay the communication of a reaction force to an input member until a predetermined output force is produced in the booster and supplied to a master cylinder.

Heretofore, it was common practice to provide an output rod of a vacuum brake booster with a threaded end section which received a screw to adjust the linkage between a booster and a master cylinder. The screw was rotated on the threaded end section before the vacuum brake booster was coupled to the master cylinder to establish the linkage between a piston in the master cylinder and the movable wall in the brake booster. When the vacuum brake booster was coupled to the master cylinder the linkage is critical to assure that movement of the movable wall as transmitted through the output rod results in a corresponding movement of the piston. The vacuum brake booster and master cylinder disclosed in U.S. Pat. No. 3,724,211 (Julow), illustrates a typical combination wherein the adjustment of the screw on an output rod of the booster requires a calibration to occur before the master cylinder is coupled to a vacuum brake booster. This calibration adjustment is necessary for the optimum relationship between a brake booster and master cylinder and takes into consideration manufacturing tolerances.

U.S. Pat. No. 4,493,742 discloses one method to reduce the time and effort required to calibrate and establish the linkage between a brake booster and master cylinder. In this method the calibration is modified through the use of a bonding material that fixes the length of the output push rod after the brake booster and master cylinder are joined together.

U.S. Pat. No. 4,953,446 discloses the importance in reducing the time involved in effecting a brake application. In this brake booster, the valve structure is positioned to initiate the development of an output force when an operator initiates movement of a brake pedal.

In U.S. patent application No. 620,979 the space relationship between the plunger and reaction disc is established by rotating a threaded end cap on an output push rod with respect to threads on a hub. The space relationship controls the communication of a reaction force to the plunger to assure that the output force from the brake booster moves the piston in the master cylinder before opposing an input force during a brake application. This structure functions in an acceptable manner, however, the cost relating to the placing threads on both the hub and head of the output push rod has been a deterrent for incorporation into a commercially acceptable brake booster.

The present invention discloses different structural components for adjusting the space relationship between a reaction disc and the plunger of a control valve to delay the reaction forces communicated to the input member until a predetermined resistive force develops in the master cylinder to assure that the pistons in the master cylinder are in a position to pressurize fluid in response to an operator input force. In this brake booster, the hub has a bore for retaining a plunger of the control valve. The hub is integral with the movable wall that separates the interior of front and rear shells of the brake booster into first and second chambers. The plunger moves in response to an actuation force from an input member by initially moving from a lap position where the first and second chambers are isolated from each other to an actuation position where the second chamber is connected to a source of fluid under pressure to develop a pressure differential across the movable wall. The pressure differential acts on the wall to transmit an output force through a resilient member to an output member. The head of the plunger has a tab which is located in a slot in the hub and by rotating the plunger, a threaded connection between the head and body of the plunger linearly moves the head with respect to the reaction disc to set the distance that a reaction force must extrude of the reaction disc before engaging the head to oppose the input force.

An advantage of this invention resides in a two piece plunger for a control valve which permits an external adjustment of the internal space relationship of the linkage between a brake booster and a master cylinder in order to match the linear movement of an input member to the brake booster with the movement of a piston in the master cylinder.

It is an object of this invention to provide a vacuum brake booster with an internal adjustment for delaying the transmission of a reaction force from an output member to an input member until after the development of pressurized fluid in the master cylinder.

These objects and advantage should be apparent from reading this specification while viewing the drawings wherein:

FIG. 1 is a sectional view of a brake booster having a two piece plunger for establishing the space relationship of a reaction disc and end of the plunger in accordance with the principals of this invention; and FIG. 2 is an enlarged view of the two piece plunger of FIG. 1.

The brake booster 10 shown in FIG. 1 is designed to be connected to a master cylinder in a brake system to assist in supplying an input force required to operate the master cylinder and effect a brake application. The brake booster 10 is designed to be quite, efficient and respond immediately to supply an operational force to the master cylinder in response to an operator input force.

The servomotor 10 has a front shell 12 joined to a rear shell 14 by a series of lances and tabs 16 to form a closed housing. The interior of the closed housing is divided by a movable wall 22 into a front chamber 18 and a rear chamber 20. The movable wall 22 includes a diaphragm 24 and an annular disc 26 that extends from a hub 28. Hub 28 has a cylindrical body 29 with a stepped bore 30 that extends therethrough. Bore 30 is connected to chamber 18 by passage 32, shown in FIG. 2, and to chamber 20 by slot or passage 34. An annular vacuum seat 36 is located between passages 32 and 34. The cylindrical body 29 which extends through an opening 40 in the rear shell 14 connects bore 30 to the surrounding environment. A seal 42 of the type disclosed in U.S. Pat. No. 4,898,081 is located between opening 40 and the exterior surface 31 on the cylindrical projection 29 to seal chamber 20 from the surrounding environment.

An output push rod 44 connected to hub 28 extends through shell 12 for providing a piston in a master cylinder (not shown) with an operational force corresponding to an input force applied to a brake pedal connected to push rod 38 of the control valve 50.

The control valve 50 includes a two piece plunger 52 and a poppet member 54 which controls the communication of air from the environment through bore 30 to chamber 20, the evacuation of air from chamber 20 to chamber 18 to equalize the pressure in chambers 18 and 20 and the isolation of chambers 18 and 20 in the rest position shown in FIG. 1 as functionally disclosed in U.S. Pat. No. 4,953,446 in anticipation of an input force from an operation to effect a brake application.

The poppet member 54 is held in bore 30 of cylindrical projection 29 by a retainer 64 of the type disclosed in U.S. patent application No. 885,710 filed May 18, 1992. Poppet member 54 has a movable face 58 which is connected by a flexible member 60 to a bead 62 fixed in the cylindrical body 29 by the retainer 64.

The two piece plunger has a first cylindrical body with a first diameter 65, a second diameter 66, a third diameter 68, a fourth diameter 70, a contoured surface 72 that terminates into a spherical face or seat 74 and a head 76. The spherical face or seat 74 has a plurality of tangs or arms 75 that engage spherical member 39 on the end of push rod 38. The engagement of the tangs detents or arms 75 allow push rod 38 to pivot about opening 73 in plunger 72 and yet form a frictional joint such that plunger 72 and push rod 38 rotate as a unit. The first diameter 65 has a threaded projection 67 extending therefrom that is located in a threaded bore 81 on head 76. The threads on the cylindrical projection 67 are matched with the threads in bore 81 to join the head 76 to the cylindrical body. The second diameter 68 receives a key member 78 of the type disclosed in U.S. Pat. No. 4,953,446 for retaining the plunger 52 in bore 30. The head 76 of the two piece plunger 52 which is retained on bearing surface 80 in hub 28 has a key 84 which is located in groove or axial slot 86 in hub 28. Head 76 has a face 82 that is located adjacent reaction disc 88. Reaction disc 88 is located in bore 45 in head 47 on output push rod 44.

After the brake booster 10 is assembled, its operational parameters such as speed, output force, vacuum leaks, etc. are checked in various test fixtures. As disclosed in U.S. Pat. No. 4,953,446 and shown in FIG. 1, when the brake booster 10 is in the rest position, key 78 and return spring 59 positions plunger 52 in a lap position where face 58 on poppet 52 is seated both on vacuum seat 36 and spherical seat 74 on head 72 to interrupt communication between chambers 18 and 20 through bore 30. When an operator desires to effect a brake application, air from the environment at atmospheric pressure is power source used to develop a pressure differential across wall 22 in response to an input force applied to push rod 38 by a brake pedal. The input force moves spherical face 74 on plunger 50 away from face 58 to allow air from the environment to flow to chamber 20 through bore 30 by way of slot 34. With air in chamber 20 and vacuum in chamber 18, a pressure differential is created across wall 22 that creates a force which is transferred into hub 28. The force from hub 28 is carried through reaction disc 88 to head 47 to provide an output force for push rod 44. When the resistance to movement of the output push rod 44 reaches a predetermined value, a portion of reaction disc 88 is extruded into bore 30 to engages face 82 on head 76 of plunger 52 to oppose the input force applied by the operator.

With the servomotor 10 in the test fixture, a rotative torque may be applied to eye 37 on push rod 38 to adjust the space relationship between reaction disc 88 and face 82 to establish the distance that the reaction disc 84 must be extruded into bore 30 before engaging face 82 on plunger 52. The key 84 on head 76 engages the hub 28 and moves along slot 86 as the cylindrical projection 67 is screwed on the threaded connection to modify the distance between face 82 and the reaction disc 84 corresponding to a desired operational characteristics for a given brake booster 10 and master cylinder. The pitch on the threads varies from 12 to 20 threads per inch on the threaded projection 67 and a complete revolution of eye 37 on push rod 38 will move the face 82 on head 76 with respect to the reaction disc 88 to provide for a fairly accurate calibration with respect to the desired gap. The space relationship or gap between reaction disc 84 and face 82 determines the distance that the output rod 44 moves before providing a reaction force which oppose the input force and can be changed to compensate for manufacturing tolerances between the components in a brake system to assure that a brake system operates within a desired specification.

We claim:

1. In a brake booster having a hub with an axial bore therein, a plunger of a control valve retained in said axial bore by a key member, said hub being attached to a moveable wall that separates the interior of front and rear shells of the brake booster into first and second chambers, said plunger responding to an actuation force from an input member by initially moving from a lap position where the first and second chambers are isolated from each other to an actuation position where the second chamber is connected to a source of fluid under pressure to develop a pressure differential across the movable wall, said pressure differential acting on said wall to transmit an output force through a resilient member to an output member, said resilient member engaging said plunger to provide a reaction force to oppose said input force, said plunger being characterized by a cylindrical body and a head, said cylindrical body having an axial threaded projection extending from a first end and a second end connected to said input member, said head having a threaded section for receiving said threaded projection and a peripheral surface with a radial key which is located in an axial slot in said axial bore in said hub, said radial key engaging said axial slot to hold said head stationary when a rotary torque is applied to said cylindrical body by said input member to screw said threaded projection into said threaded section in said head to axially position said head within said axial bore of said hub and establish a gap between a face on said head and said resilient member, said gap determining the distance that the resilient member must be extruded before engaging said face to match a resulting output force with a desired output force which is supplied to a master cylinder.

2. In the brake booster as recited in claim 1 wherein the pitch of the threads on the treaded projection of said plunger effect the accuracy of the gap with respect to a desired standard.

3. In the brake booster as recited in claim 2 wherein said plunger includes:
  a plurality of detents that engage an input push rod, said detents allowing said push rod to pivot about said plunger while forming a unitary structure such that rotation of said push rod causes a corresponding rotation in said cylindrical body of said plunger.

* * * * *